United States Patent
Lu et al.

(10) Patent No.: US 10,438,362 B2
(45) Date of Patent: Oct. 8, 2019

(54) METHOD AND APPARATUS FOR HOMOGRAPHY ESTIMATION

(71) Applicant: HERE Global B.V., Eindhoven (NL)

(72) Inventors: Victor Lu, Chicago, IL (US); Ian Endres, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 22 days.

(21) Appl. No.: 15/609,781

(22) Filed: May 31, 2017

(65) Prior Publication Data
US 2018/0350085 A1    Dec. 6, 2018

(51) Int. Cl.
G06K 9/32      (2006.01)
G06T 7/33      (2017.01)
G06T 11/60     (2006.01)

(52) U.S. Cl.
CPC .............. G06T 7/337 (2017.01); G06T 11/60 (2013.01)

(58) Field of Classification Search
None
See application file for complete search history.

(56) References Cited

U.S. PATENT DOCUMENTS

| | | | | |
|---|---|---|---|---|
| 5,420,940 A * | 5/1995 | Sedlar | ................. | G06T 15/10 382/276 |
| 6,195,101 B1 * | 2/2001 | Ghislain Bossut | ..... | G06T 11/60 345/629 |
| 7,009,655 B2 * | 3/2006 | Huang | ................. | G11B 27/034 348/441 |
| 8,913,847 B2 * | 12/2014 | Tang | ................. | G06T 11/60 382/284 |
| 8,923,652 B2 | 12/2014 | Gallo et al. | | |
| 9,141,871 B2 | 9/2015 | Pires et al. | | |
| 9,219,840 B2 | 12/2015 | Ashbrook et al. | | |
| 9,286,656 B2 * | 3/2016 | Lee | ................. | G06T 3/4084 |
| 10,009,586 B2 * | 6/2018 | Mutter | ................. | G06F 3/03543 |
| 2003/0146922 A1 * | 8/2003 | Navab | ................. | G01N 33/84 345/633 |
| 2004/0189674 A1 * | 9/2004 | Zhang | ................. | H04N 1/04 345/629 |

(Continued)

OTHER PUBLICATIONS

Lhuillier, M. et al., *A Quasi-dense Approach to Surface Reconstruction From Uncalibrated Images*, [online] [retrieved Jun. 28, 2017]. Retrieved from the Internet: <https://hal.archives-ouvertes.fr/hal-00091032/document>. (dated Sep. 5, 2006) 36 pages.

*Primary Examiner* — Jayesh A Patel
(74) *Attorney, Agent, or Firm* — Alston & Bird LLP

(57) ABSTRACT

Embodiments described herein relate generally to determining correspondence between a template and an object in an image. A method may include: receiving an image of an environment including an image of an object within the image of the environment; resizing the first template to obtain a scaled first template having a size corresponding to a size of the image of the object; calculating a number of correspondences between the scaled first template and the image of the object; receiving a candidate homography; testing the candidate homography; and replacing the image of the object with a second template of a different object according to the candidate homography in response to the candidate homography being established as corresponding to the image of the object.

23 Claims, 9 Drawing Sheets

(56) References Cited

U.S. PATENT DOCUMENTS

| | | | |
|---|---|---|---|
| 2006/0197839 A1* | 9/2006 | Senior | H04N 5/232 348/169 |
| 2008/0150965 A1* | 6/2008 | Bischoff | G02B 27/01 345/632 |
| 2009/0161911 A1* | 6/2009 | Shih | G06T 7/254 382/103 |
| 2010/0232709 A1* | 9/2010 | Zhang | G06T 7/73 382/201 |
| 2012/0127171 A1* | 5/2012 | Li | G06T 1/20 345/419 |
| 2013/0044913 A1* | 2/2013 | Jin | G06T 7/20 382/103 |
| 2013/0236114 A1* | 9/2013 | Cho | G06T 5/003 382/255 |
| 2014/0086494 A1* | 3/2014 | Benhimane | G06T 3/0093 382/215 |
| 2014/0300704 A1* | 10/2014 | Ramaswamy | G06T 7/85 348/48 |
| 2016/0042544 A1* | 2/2016 | Moesle | G06K 9/00818 345/629 |

\* cited by examiner

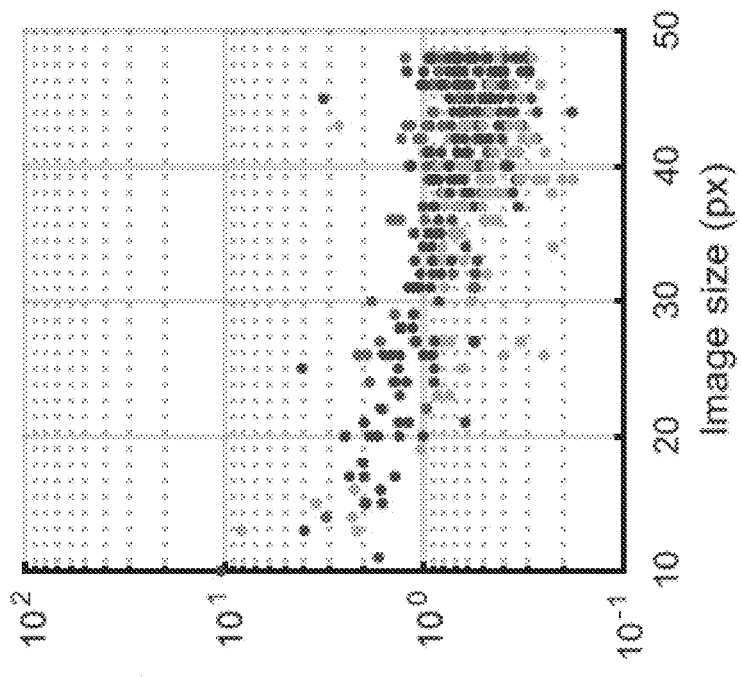
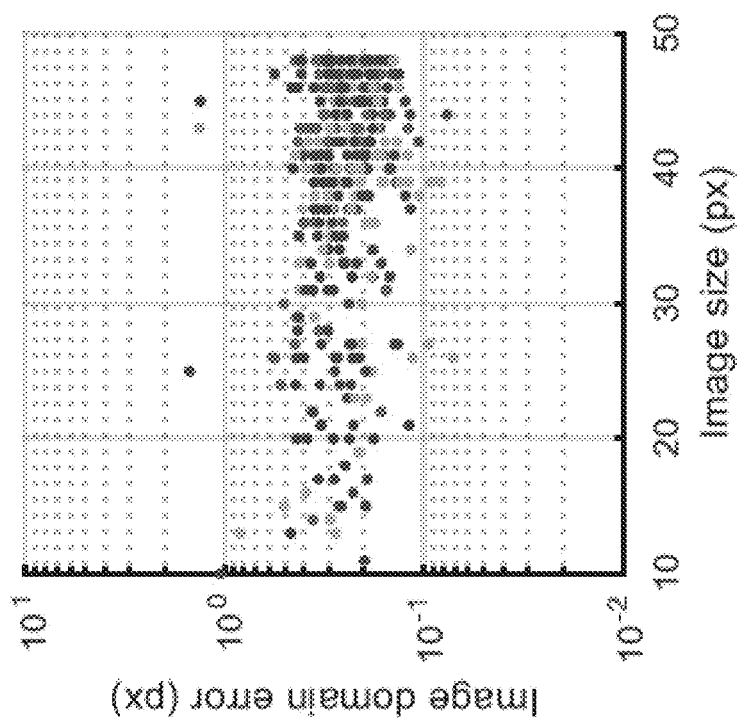
FIG. 6

METHOD AND APPARATUS FOR HOMOGRAPHY ESTIMATION

TECHNOLOGICAL FIELD

Example embodiments described herein relate generally to determining correspondence between a template and an image, and more particularly, to scaling a template according to an image and iteratively testing candidate homographies in order to establish the homography that provides the best correspondence between the template and the image.

BACKGROUND

Road geometry modelling is very useful for map creation and terrain identification along with feature and obstacle detection in environments, each of which may facilitate autonomous vehicle navigation along a prescribed path. Traditional methods for modelling of road geometry and object or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Some current methods rely upon feature detection from image data to model or reproduce signs or other points of interest along a route. However, while images of an environment may remain static and unchanging, the environment itself may change routinely. For example, signs that provide an indication of a road condition may change season-to-season, while signs that provide an indication of a business may change based upon a change in the business at a particular location. Further, signs that indicate a price for services or products, such as the price of gasoline or the price of a hotel room, may change daily, weekly, or according to almost any frequency. It is not feasible to obtain images of an environment each time a sign changes or another feature of the environment changes.

BRIEF SUMMARY

Embodiments described herein relate generally to determining correspondence between a template and an object in an image. More particularly, embodiments relate to scaling a template image according to an object in an image of an environment and iteratively testing candidate homographies in order to establish the homography that provides the best correspondence between the template and the image, such that the object in the image can be replaced with one or more templates.

According to an embodiment described herein an apparatus is provided including at least one processor and at least one memory including computer program code. The at least one memory and the computer program code configured to, with the at least one processor, cause the apparatus to: receive an image of an environment including an image of an object within the image of the environment; receive a first template; resize the first template to obtain a scaled first template having a size corresponding to the size of the image of the object; calculate a number of correspondences between the scaled first template and the image of the object; receive a candidate homography; test the candidate homography; and replace the image of the object with a second template of a different object according to the candidate homography in response to the candidate homography being established as corresponding to the image of the object.

According to some embodiments, causing the apparatus to replace the image of the object with a second template of a different object may include causing the apparatus to: receive the second template; and apply a projective transformation to the second template corresponding to a projective transformation determined to align the scaled first template to the image of the object. Causing the apparatus to replace the image of the object with a second template of a different object may optionally include causing the apparatus to: establish a relationship between a clean, aligned rendering of an object corresponding to the object of the image of the object; obtain parameters of the relationship for one or more of a linear color map, additive Gaussian noise, or Gaussian blurring; and apply the one or more of the linear color map, additive Gaussian noise, or Gaussian blurring to the second template according to the obtained parameters.

Causing the apparatus to resize the first template to obtain a scaled first template having a size corresponding to a size of the image may include causing the apparatus to: apply a plurality of scaling factors to the first template, where the plurality of scaling factors are within a predefined range, where each scaling factor applied to the first template may result in a respective trial scaled first template; for each trial scaled first template, compute a number of dense correspondences between the trial scaled first template and the image of the object; for each trial scaled first template, compute a median projection error between the trial scaled first template and the image of the object; and apply an algorithm to the number of dense correspondences and the median projection error for each trial scaled template to establish the trial scaled first template to be selected as the scaled first template.

Causing the apparatus to test a candidate homography may include causing the apparatus to: determine an average value and standard deviation for pixel value of the image; determine an average value and standard deviation for pixel value of the scaled template; subtract the average value for pixel value of the image from the value of each pixel of the image to obtain a corrected pixel value for each pixel and divide the corrected value of each pixel by the standard deviation for the pixel value of the image to obtain a normalized value of each pixel of the image; subtract the average value for pixel value of the scaled first template from the value of each pixel of the scaled first template to obtain a corrected pixel value for each pixel and divide the corrected value of each pixel of the standard deviation for the pixel value of the image to obtain a normalized value of each pixel of the scaled first template; and determine the similarity between the image and the scaled first template using the normalized values for each pixel.

Causing the apparatus to test the candidate homography may include causing the apparatus to: calculate an implied horizon of an underlying plane corresponding to the object in the image of the object; determine if the implied horizon is within a predefined measure of the image of the object; and reject the candidate homography in response to the implied horizon being within a predefined measure of the image of the object. Causing the apparatus to calculate a number of correspondences between the scaled first template and the image may include causing the apparatus to determine pixels of the scaled template to skip, and for each non-skipped pixel in the scaled template, find its most similar pixel in the image, where the similarity is measured by causing the apparatus to measure a normalized cross correlation between a patch of pixels of a predetermined width and height centered at each non-skipped pixel in the scaled template. Causing the apparatus to determine pixels of the scaled template to skip may include causing the apparatus to skip pixels centered within the patches of a predetermined width and height having a standard deviation among the pixels of a respective patch below a predefined value.

According to some embodiments, in response to causing the apparatus to test the candidate homography, the apparatus may be caused to propose a new candidate homography and test the new candidate homography. In response to causing the apparatus to test the new candidate homography, and in response to a number of proposed candidate homographies not reaching a predefined number of iterations of candidate homographies causing the apparatus to propose another new candidate homography and test the another new candidate homography. In response to the number of proposed candidate homographies reaching the predefined number of iterations of candidate homographies, causing the apparatus to: establish a preferred homography from among the proposed candidate homographies; in response to the number of iterations of calculating correspondences not reaching another predetermined number of iterations, calculate a number of correspondences between the scaled first template with the preferred homography applied and the image of the object; receive another candidate homography; and test the another candidate homography as applied to the scaled first template with the preferred homography applied.

Embodiments provided herein may include a computer program product including at least one computer-readable storage medium having computer-executable program code portions stored therein, the computer-executable program code portions including program code instructions that, when executed, cause an apparatus to: receive an image of an environment including an image of an object within the image of the environment; receive a first template; resize the first template to obtain a scaled first template having a size corresponding to a size of the image of the object; calculate a number of correspondences between the scaled first template and the image of the object; receive a candidate homography; test the candidate homography; and replace the image of the object with a second template of a different object according to the candidate homography in response to the candidate homography be established as corresponding to the image of the object.

According to some embodiments, the program code instructions to cause the apparatus to replace the image of the object with a second template of a different object may include program code instructions to cause the apparatus to: receive the second template; and apply a projective transformation of the second template corresponding to a projective transformation determined to align the scaled first template to the image of the object. The program code instructions to cause the apparatus to replace the image of the object with a second template of a different object may optionally include program code instructions to cause the apparatus to: establish a relationship between a clean, aligned rendering of an object corresponding to the object of the image of the object; obtain parameters from the relationship for one or more of a linear color map, additive Gaussian noise, or Gaussian blurring; and apply the one or more of the linear color map; additive Gaussian noise, or Gaussian blurring to the second template according to the obtained parameters.

According to some embodiments, the program code instructions to cause the apparatus to resize the first template to obtain a scaled first template having a size corresponding to a size of the image of the object may include program code instructions to cause the apparatus to: apply a plurality of scaling factors to the first template, where the plurality of scaling factors are within a predefined range, where each scaling factor applied to the first template results in a respective trial scaled first template; for each trial scaled first template, compute a number of dense correspondences between the trial scaled first template and the image of the object; for each trial scaled first template, compute a median projection error between the trial scaled first template and the image of the object; and apply an algorithm to the number of dense correspondences and the median projection error for each trial scaled first template to establish the trial scaled first template to be selected as the scaled first template.

According to some embodiments, the program code instructions to cause the apparatus to test a candidate homography may include program code instructions to cause the apparatus to: determine an average value and standard deviation for pixel value of the image of the object; determine an average value and standard deviation for pixel value of the scaled template; subtract the average value for pixel value of the image from the value of each pixel of the image of the object to obtain a corrected pixel value for each pixel and divide the corrected value of each pixel by the standard deviation for the pixel value of the image to obtain a normalized value of each pixel of the image; subtract the average value for pixel value of the scaled first template from the value of each pixel of the scaled first template to obtain a corrected pixel value for each pixel and divide the corrected value of each pixel by the standard deviation for the pixel value of the image of the object to obtain a normalized value of each pixel of the scaled first template; and determine the similarity between the image and the scaled first template using the normalized values for each pixel.

The program code instructions to cause the apparatus to test the candidate homography may include program code instructions to cause the apparatus to: calculate an implied horizon of an underlying plane corresponding to the object in the image of the object; determine if the implied horizon is within a predefined measure of the image of the object; and reject the candidate homography in response to the implied horizon being within a predefined measure of the image of the object.

The program code instructions to cause the apparatus to calculate a number of correspondences between the scaled first template and the image may include program code instructions to cause the apparatus to: determine pixels of the scaled template to skip; and for each non-skipped pixel in the scaled template, find its most similar pixel in the image of the object, where similarity is measured by causing the apparatus to measure a normalized cross correlation between a patch of pixels of a predetermined width and height centered at each non-skipped pixel in the scaled template. The program code instructions to cause the apparatus to determine pixels of the scaled template to skip may include program code instructions to cause the apparatus to skip pixels centered within patches of predetermined width and height having a standard deviation among the pixels of a respective patch below a predefined threshold.

Embodiments described herein may provide a method including: receiving an image of an environment including an image of an object within the image of the environment; resizing the first template to obtain a scaled first template having a size corresponding to a size of the image of the object; calculating a number of correspondences between the scaled first template and the image; receiving a candidate homography; testing the candidate homography; and replacing the image of the object with a second template of a different object according to the candidate homography in response to the candidate homography being established as corresponding to the image of the object. Replacing the image of the object with a second template of a different object may include: receiving the second template; and applying a projective transformation to the second template corresponding to a projective transformation determined to align the scaled first template to the image of the object.

According to some embodiments, replacing the image of the object with a second template of a different object may include: establishing a relationship between a clean, aligned rendering of an object corresponding to the object of the image of the object; obtaining parameters from the relationship for one or more of a linear color map, additive Gaussian noise, or Gaussian blurring; and applying the one or more of the linear color map, additive Gaussian noise, or Gaussian blurring to the second template according to the obtained parameters. Resizing the first template to obtain a scaled first template having a size corresponding to a size of the image of the object may include: applying a plurality of scaling factors to the first template, where the plurality of scaling factors are within a predefined range, where each scaling factor applied to the first template results in a respective trial scaled first template; for each trial scaled first template, computing a number of dense correspondences between the trial scaled first template and the image of the object; for each trial scaled first template, computing a median projection error between the trial scaled first template and the image of the object; and applying an algorithm to the number of dense correspondences and the median projection error for each trial scaled first template to establish the trial scaled first template to be selected as the scaled first template.

Embodiments may provide a user interface, where the user interface includes a display of an image of an environment. An object in the environment captured by the image is replaced by an image of an object by a processing device caused to: receive an image of the environment including the image of the object; receive a first template; resize the first template to obtain a scaled first template having a size corresponding to a size of the image of the object; calculate a number of correspondences between the scaled first template and the image of the object; receive a candidate homography; test the candidate homography; and replace the image of the object with a second template of a different object according to the candidate homography in response to the candidate homography being established as corresponding to the image of the object. Replacing the image of the object with a second template of a different object may include receiving the second template; and applying a projective transformation to the second template corresponding to a projective transformation determined to align the scaled first template to the image of the object.

According to some embodiments, the processing device cause to replace the image of the object with a second template of a different object may include causing the processing device to: establish a relationship between a clean, aligned rendering of an object corresponding to the object of the image of the object; obtain parameters from the relationship for one or more of a linear color map, additive Gaussian noise, or Gaussian blurring; and apply the one or more of the linear color map, additive Gaussian noise, or Gaussian blurring to the second template according to the obtained parameters. The processing device caused to resize the first template to obtain a scaled first template having a size corresponding to a size of the image of the object may include causing the processing device to: apply a plurality of scaling factors to the first template, where the plurality of scaling factors are within a predefined range, where each scaling factor applied to the first template may result in a respective trial scaled first template; for each trial scaled first template, compute a number of dense correspondences between the trial scaled first template and the image of the object; for each trial scaled first template, compute a median projection error between the trial scaled first template of the image of the object; and apply an algorithm to the number of dense correspondences and the median projection error for each trial scaled first template to establish the trial scaled first template to be selected as the scaled first template.

Embodiments may provide an apparatus including at least one processor and at least one memory including computer program code. The at least one memory and the computer program code configured to, with the at least one processor, cause the apparatus to: receive an image of an environment; identify an image of an object within the image of the environment; establish a preferred homography relating the image of the object within the image of the environment to a template image; and replace the image of the object with a replacement image according to the template image and the established homography. Causing the apparatus to establish a preferred homography of the image of the object within the image of the environment may include causing the apparatus to: iteratively propose a predetermined number of candidate homographies and test the candidate homographies to establish the preferred candidate homography from among the candidate homographies; and compute correspondences of the template image to the image of the object warped according to the preferred candidate homography. Causing the apparatus to iteratively propose and test a predetermined number of candidate homographies and compute correspondences of the template image of the object warped according to the preferred candidate homography may be performed for a predetermined number of iterations.

Embodiments described herein may provide an apparatus including: means for receiving an image of an environment including an image of an object within the image of the environment; means for resizing the first template to obtain a scaled first template having a size corresponding to a size of the image of the object; means for calculating a number of correspondences between the scaled first template and the image; means for receiving a candidate homography; testing the candidate homography; and means for replacing the image of the object with a second template of a different object according to the candidate homography in response to the candidate homography being established as corresponding to the image of the object. The means for replacing the image of the object with a second template of a different object may include: means for receiving the second template; and means for applying a projective transformation to the second template corresponding to a projective transformation determined to align the scaled first template to the image of the object.

According to some embodiments, the means for replacing the image of the object with a second template of a different object may include: means for establishing a relationship between a clean, aligned rendering of an object corresponding to the object of the image of the object; means for obtaining parameters from the relationship for one or more of a linear color map, additive Gaussian noise, or Gaussian blurring; and means for applying the one or more of the linear color map, additive Gaussian noise, or Gaussian blurring to the second template according to the obtained parameters. The means for resizing the first template to obtain a scaled first template having a size corresponding to a size of the image of the object may include: means for applying a plurality of scaling factors to the first template, where the plurality of scaling factors are within a predefined range, where each scaling factor applied to the first template results in a respective trial scaled first template; for each trial scaled first template, means for computing a number of dense correspondences between the trial scaled first template and the image of the object; for each trial scaled first template, means for computing a median projection error between the trial scaled first template and the image of the object; and means for applying an algorithm to the number of dense correspondences and the median projection error for each trial scaled first template to establish the trial scaled first template to be selected as the scaled first template.

BRIEF DESCRIPTION OF THE DRAWINGS

Figure 1:
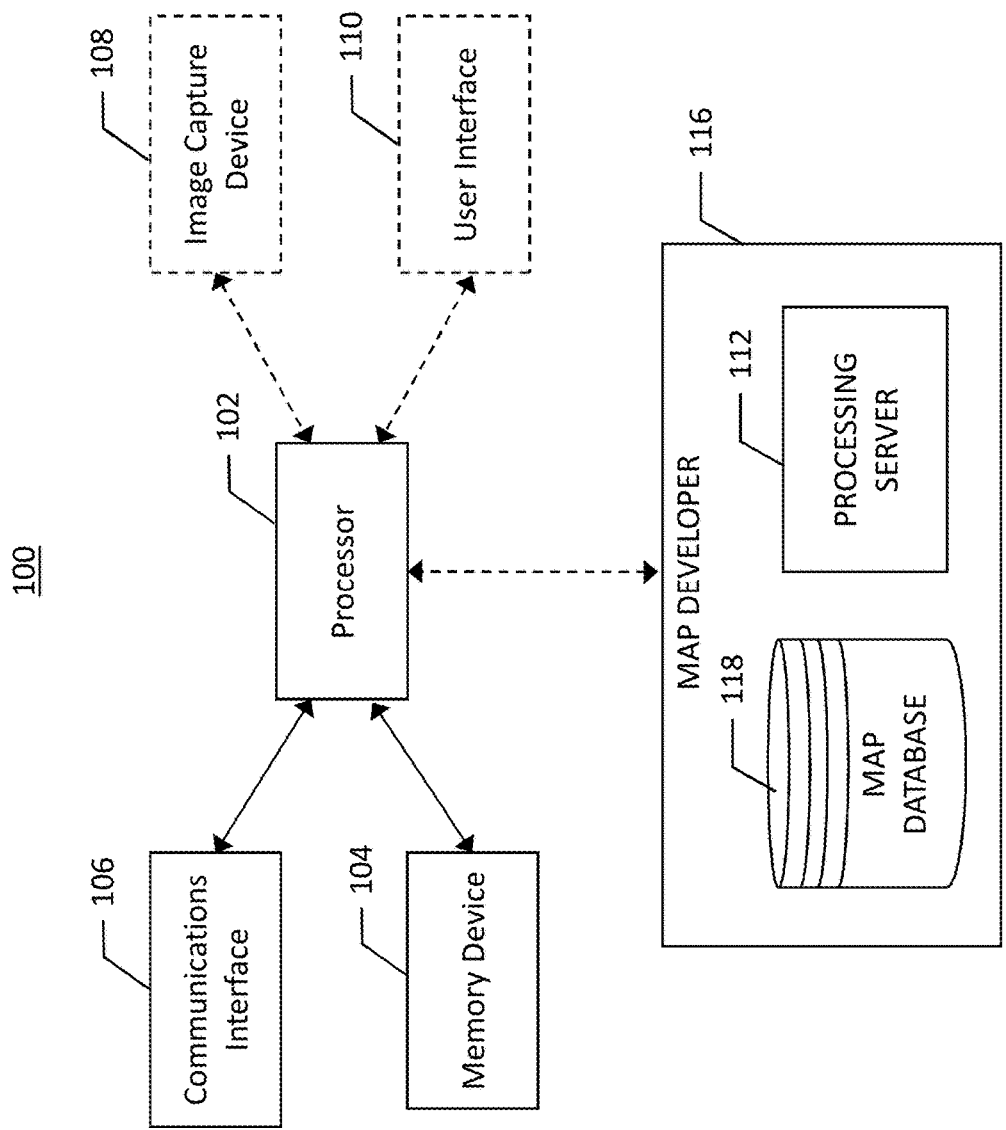
Figure 2:
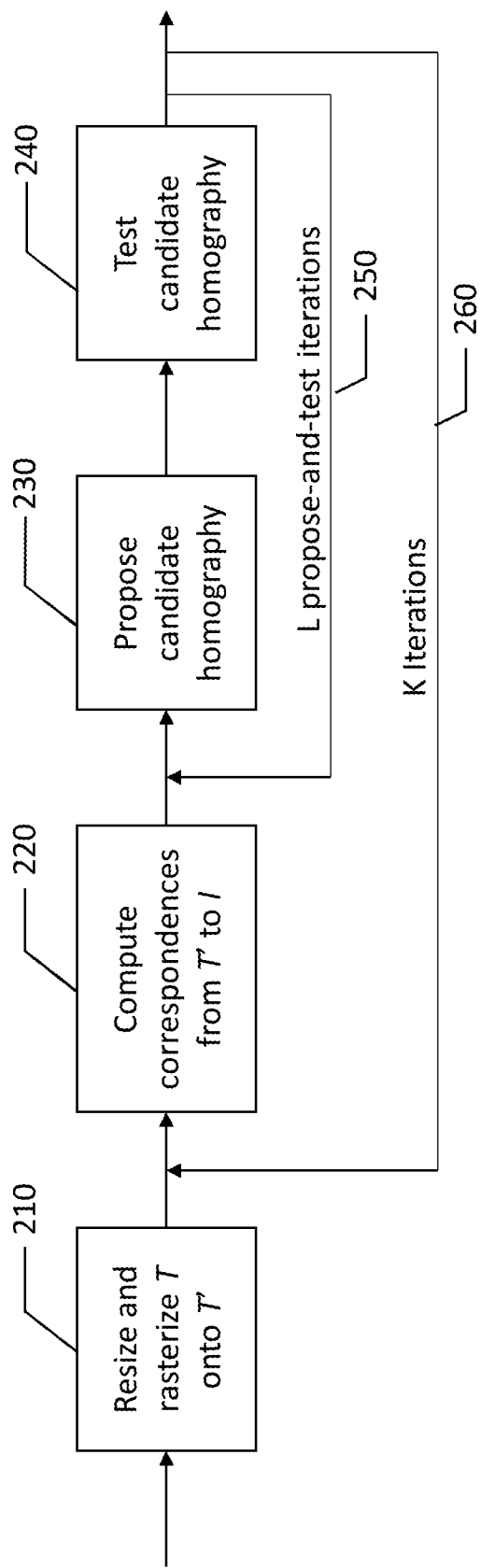
Figure 3:
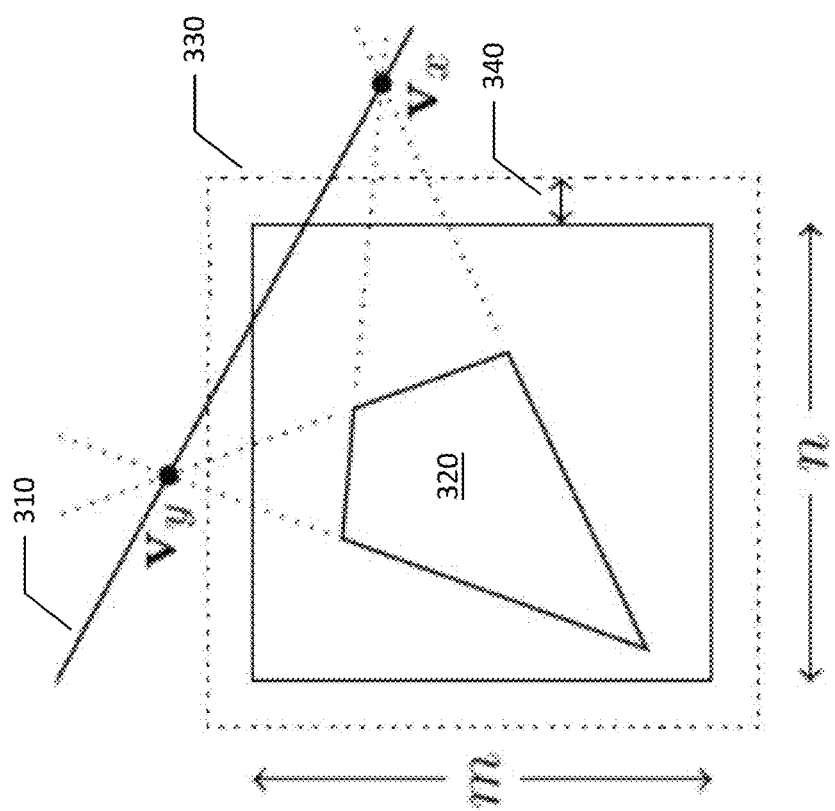
Figure 4:
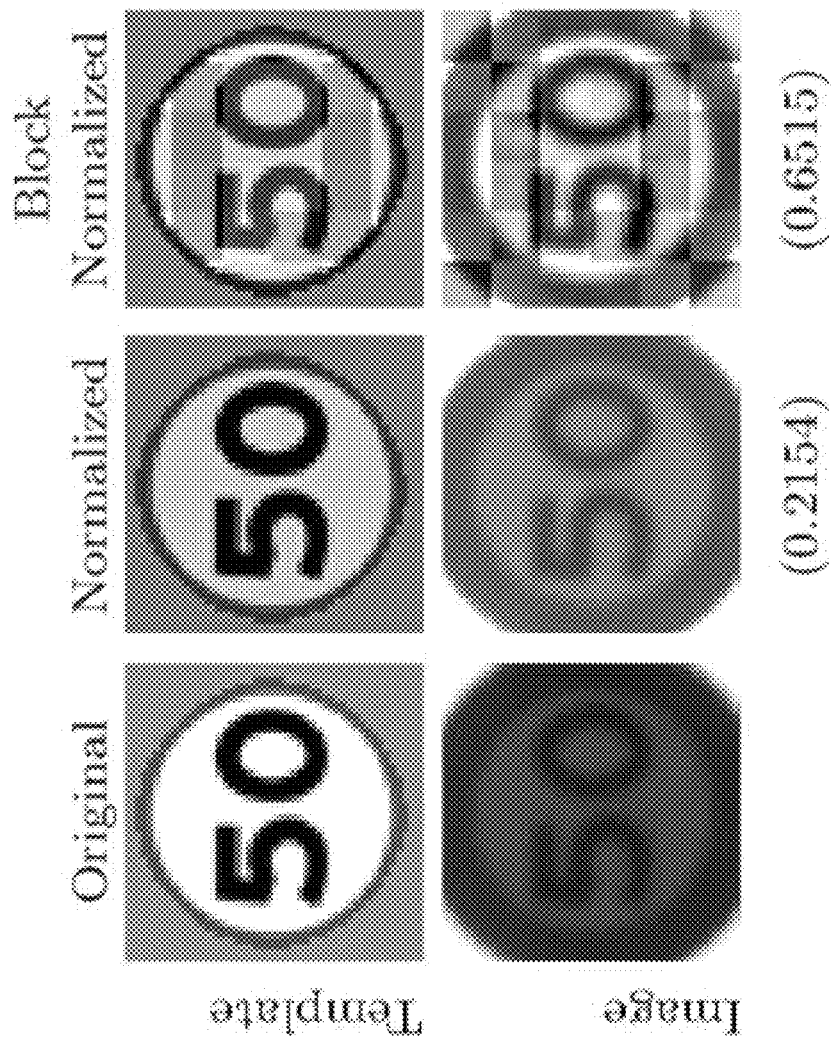
Figure 5:
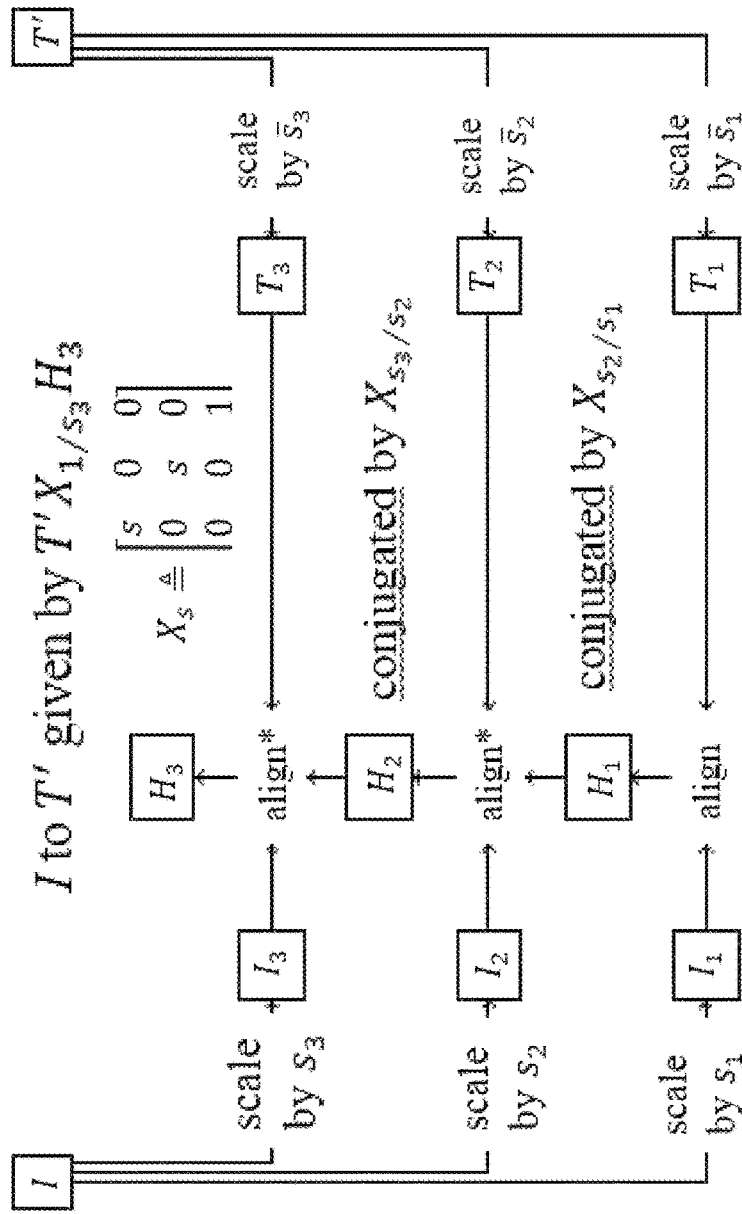
Figure 7:
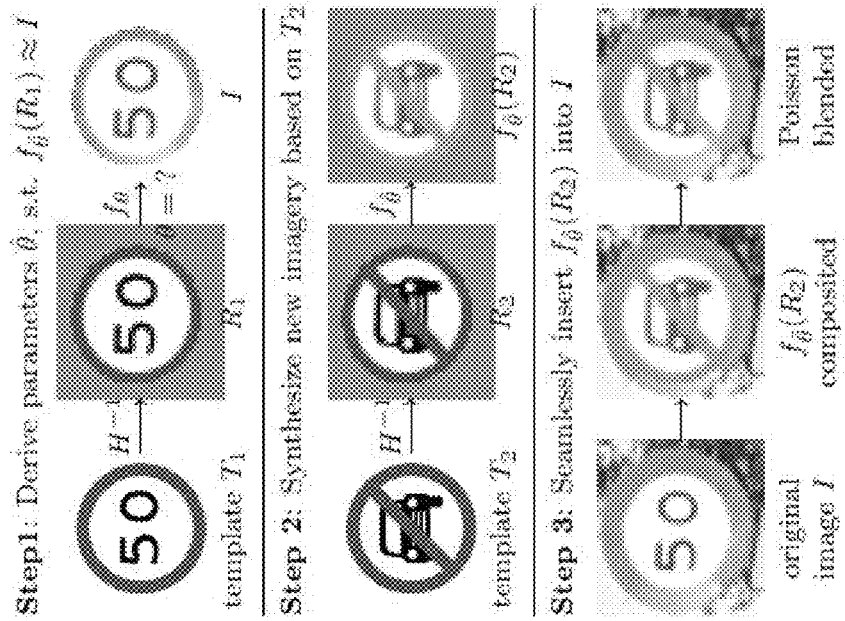
Figure 8:
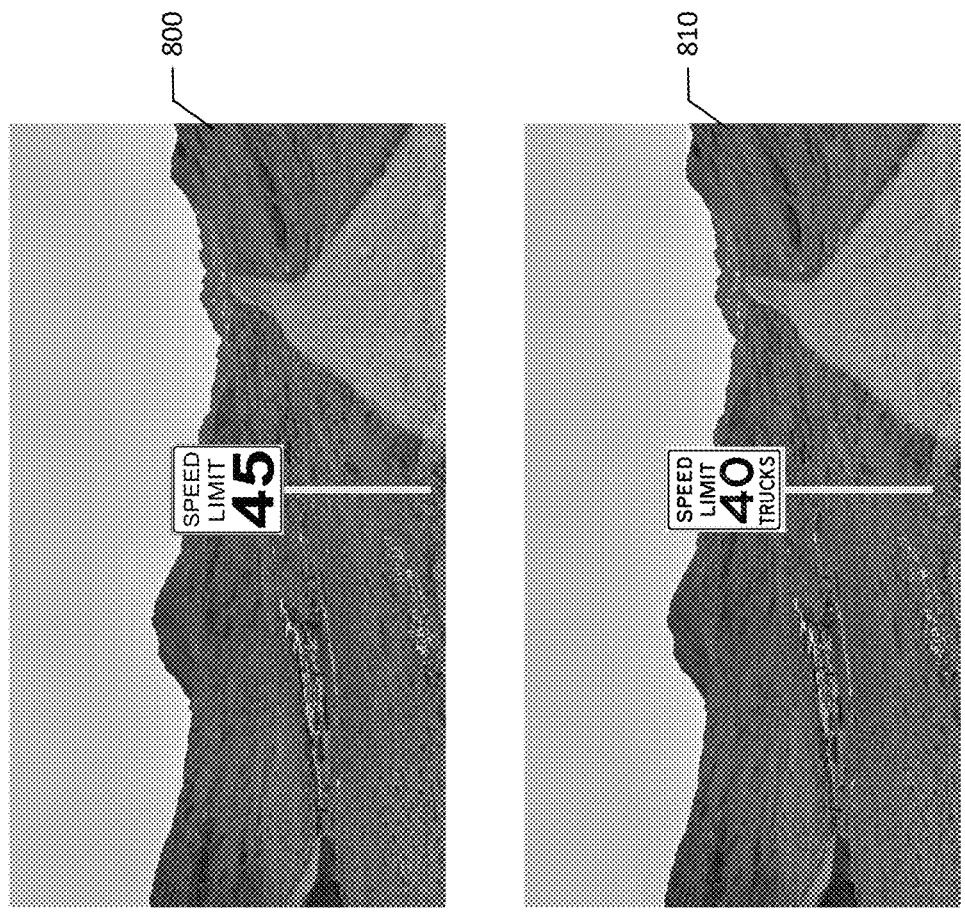
Figure 9:
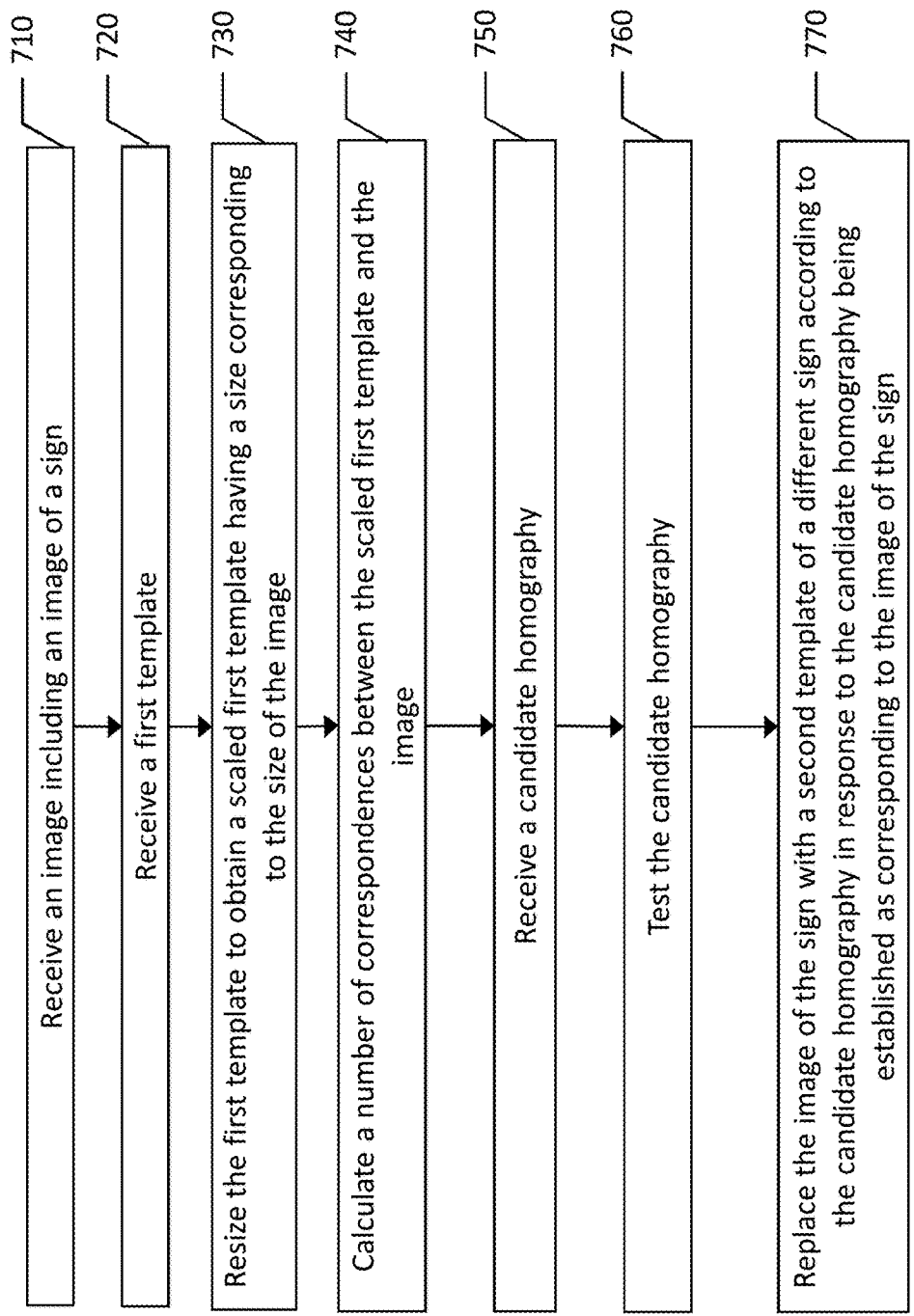

Having thus described certain example embodiments of the present disclosure in general terms, reference will now be made to the accompanying drawings, which are not necessarily drawn to scale, and wherein:

FIG. 1 shows a block diagram of an apparatus that may be specifically configured in accordance with an example embodiment;

FIG. 2 is a flowchart of operations for performing a method of iteratively testing candidate homographies in order to establish the homography that provides the best correspondence between the template and the image according to an example embodiment;

FIG. 3 illustrates an example embodiment of the calculation of a horizon of an underlying plane of a sign according to an example embodiment;

FIG. 4 illustrates uniform normalization over an image and blocked normalization of an image according to an example embodiment;

FIG. 5 is an illustration of estimate coarse-to-fine extension on the basic homography estimation procedure of FIG. 2 according to an example embodiment, where the "align" blocks of FIG. 5 encapsulate blocks 220, 230, 240, 250, and 260 of FIG. 2;

FIG. 6 illustrates alignment error plotted against image size according to an example embodiment;

FIG. 7 is an overview of a sign replacement procedure according to an example embodiment;

FIG. 8 depicts a user-interface view of a sign replacement procedure according to an example embodiment; and FIG. 9 is a flowchart of a method for iteratively testing candidate homographies in order to establish the homography that provides the best correspondence between a template and an image according to an example embodiment.

DETAILED DESCRIPTION

Some embodiments of the present invention will now be described more fully hereinafter with reference to the accompanying drawings, in which some, but not all embodiments are shown. Indeed, these embodiments may be in many different forms and should not be construed as limiting; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments. Thus, use of any such terms should not be taken to limit the spirit and scope of embodiments.

A method, apparatus, and computer program product are provided in accordance with an example embodiment to iteratively test candidate homographies in order to establish the homography that provides the best correspondence between a template and an image. Methods described herein rely on establishing an iteratively refined dense correspondence from the template to the image. The dense approach strives to match all pixels and can thus discover more correspondences than a sparse approach. This approach enables robustness against false matches and positional errors.

Traffic signs and logos convey important locational information, such as the presence of certain driving/parking restrictions, traffic conditions, the presence of certain stores, etc. Signs may provide valuable information that is informative to a variety of applications and those applications may benefit from sign recognition methods. Applications such as map making, autonomous driving, and other applications that use environmental object recognition may leverage state of the art detectors that output a rectangle that roughly bounds a detected sign. Beyond conveying the position of a sign within an image, a detection box identifying the location of a sign does not convey information regarding a sign's orientation, contour, or appearance (e.g., lightness, blurriness, etc.)—attributes which are readily perceived by a human looking at the sign. To perceive these attributes, imagery must be further analyzed within the detection box of the sign. Embodiments described herein establish an association between a sign image and its underlying template pattern which may enable substitution of the sign in a captured image with a template sign, for example.

Many signs are printed, stamped, or otherwise formed on a planar surface using a known template pattern. Using a pinhole camera model, the image of such a sign is known to be related to its template by a homography, or an isomorphism of projective spaces induced by an isomorphism of the vector spaces from which the projective spaces derive. By knowing the homography, the template can be overlaid on the image to give a higher quality delineation of the sign, or to replace an existing sign with a template corresponding to a different sign. As a homography is in part determined by a camera's pose relative to the sign's orientation, knowing the homography may also provide partial information on a camera's pose and the underlying orientation of the plane of the sign.

Images of roadways and their respective environments are typically captured from vehicles traversing the roadway, such that signs within the images typically occupy only a small number of pixels and thus pose challenges to existing methods of homography. For example, according to a study by the inventors, speed limit signs are typically no larger than 64 by 64 pixels in a 1600 pixel by 1200 pixel street view image. A standard approach to establishing sparse keypoint correspondences between a template and an image may not work because existing keypoint detectors such as SIFT (Scale Invariant Feature Transform) or SURF (Speeded-Up Robust Features) tend to return very few keypoints for low resolution images of low texture patterns such as signs.

Conventionally, homography estimation is performed by establishing sparse keypoint correspondences between a template and an image, and then finding a homography that best agrees with the found correspondences. When applied to street signs, existing keypoint detectors (SIFT/SURF)

return very few keypoints due to the tendency of signs having little texture and occupying a small number of pixels in street images. Further, keypoints are sometimes poorly positioned and incorrectly matched. Fitting to such a set of correspondences, regardless of the chosen error metric, may yield a poor homography.

Instead of computing correspondences on a sparse set of keypoints, which may tend to be too sparse for low resolution sign images, embodiments described herein provide a method that establishes an iteratively refined dense correspondence from template to image. A dense approach strives to match all pixels and can thus determine more correspondences than a sparse approach. A larger number of correspondences enables robustness to false matches and positional errors. Methods described herein use these correspondences to propose candidate homographies. The candidate homographies are then tested using a heuristic for rejecting bad homographies and a blocked normalized cross correlation (BNCC) for measuring alignment quality of the homographies. Embodiments described herein use an ad hoc approach of performing a brute force search for the patch with the highest normalized cross correlation (NCC) followed by heuristics for rejecting bad correspondences.

A homography is a mapping from $R^2$ (a first 2-dimensional image) to $R^2$ (a second 2-dimensional image) and can be represented by a 3×3 matrix. Let H: $R^2 \rightarrow R^2$ denote a homography, and let H also denote its matrix representation. Given a point $(u, v) \in R^2$, its image $(x,y)=H(u, v)$ can be computed by multiplying $[u\ v\ 1]^T$ by H's 3×3 matrix representation and then dividing through by the resulting vector's third component $\gamma \in R$.

$$\begin{bmatrix} \gamma x \\ \gamma y \\ \gamma \end{bmatrix} = H \begin{bmatrix} u \\ v \\ 1 \end{bmatrix} \quad (1)$$

Assuming I is an m×n image (i.e., an image with m rows and n columns), we use $I_H^{m'\times n'}$ to denote I mapped by H onto a m'×n' image, whose pixel on the i-th row and the j-th column has a value given by sampling I at $H^{-1}(j, i)$. We assume out-of-bound sampling (i.e., $H^{-1}(j, i)$ not in the domain of I) returns NaN. We refer hereafter to pixels that are either NaN or transparent (transparent pixels are commonly encountered in template images) as invalid pixels.

$$I_H^{m'\times n'} \triangleq I \text{ warped by H onto a m'xn'grid} \quad (2)$$

Regardless of the type of computing device, an apparatus 100 that is embodied by or associated with the computing device as illustrated in FIG. 1, may be specifically configured to establish an iteratively refined dense correspondence from a template to image. It should be noted that while FIG. 1 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 102, a memory device 104, a communication interface 106, and optionally an image capture device 108 and a user interface 110. In some embodiments, the processor 102 (and/or co-processor or any other processing circuitry assisting or otherwise associated with the processor) may be in communication with the memory device 104 via a bus for passing information among components of the apparatus. The memory device 104 may be non-transitory and may include, for example, one or more volatile and/or non-volatile memories. In other words, for example, the memory device 104 may be an electronic storage device (e.g., a computer readable storage medium) comprising gates configured to store data (e.g., bits) that may be retrievable by a machine (e.g., a computing device like the processor). As defined herein, a "computer-readable storage medium," refers to a non-transitory physical storage medium (e.g., a volatile or non-volatile memory device) which is distinct from a "computer-readable transmission medium," which may take the form of an electromagnetic signal. The memory device 104 may be configured to store information, data, content, applications, instructions, or the like, for enabling the apparatus to carry out various functions in accordance with an example embodiment of the present invention. For example, the memory device 104 could be configured to buffer input data for processing by the processor 102 or to store image or model data, using which the apparatus 100 may identify image features such as travel lanes of a roadway. Additionally or alternatively, the memory device 104 could be configured to store instructions for execution by the processor 102.

The processor 102 may be embodied in a number of different ways. For example, the processor may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 102 may be configured to execute instructions stored in the memory device 104 or otherwise accessible to the processor. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a pass-through display or a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 102.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 100 may also include an image capture device 108, which may be any form of device capable of capturing a visual representation of an environment, such as an image of the environment ahead or in front of a vehicle traveling along a roadway. The image capture may optionally be a camera or sensor configured to capture light reflected off of objects in the environment. The image capture device 108 may optionally include, for example, a LIDAR (light detection and ranging) scanning device, which includes a laser emitter for transmitting laser pulses, and a sensor configured to detect the laser pulses as they return to the LIDAR scanning device to form a pixel map of the environment from the LIDAR data. The image capture device 108 or other element of the apparatus 100 may include one or more geo-referencing systems, such as the Global Positioning System (GPS), precision gyroscopes, or the like. Accordingly, images captured with the image capture device 108 may be associated with a location at which the image was captured, and may also be associated with a heading established based on dynamic analysis of the location or position of the apparatus 100.

Example embodiments described herein may use images having features identified therein, embodiments of an apparatus may include feature detection logic applied by the processor 102 to images from the image capture device 108 to establish the location of features and objects within a captured image, such as images of signs within an image of an environment.

While apparatus 100 may include an image capture device 108 in some embodiments, in other embodiments apparatus 100 does not include image capture device 108 and instead is configured to receive image data from another apparatus via communications device 106 or from a user via user interface 110. Accordingly, while some embodiments of the invention enable the capture and analysis of image data within apparatus 100, other embodiments may separate the operations involved in acquiring image data from the operations involved in analyzing the image data to establish features in the environment.

In some embodiments, the apparatus 100 may include a user interface 110 that may, in turn, be in communication with processor 102 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor and/or user interface circuitry comprising the processor may be configured to control one or more functions of one or more user interface elements through computer program instructions (e.g., software and/or firmware) stored on a memory accessible to the processor (e.g., memory device 104, and/or the like).

Embodiments may include or be otherwise in communication with, such as via a network, a map developer 116 as shown in FIG. 1. The map developer may include a map database 118 and a processing server 112. The map developer may be a service available via a network provided by a third party or may include local processing and storage according to various embodiments. Processing server 102 may be one or more fixed or mobile computing devices. The processor 102 may be configured to access the map database 118 via the processing server 102 through, for example, a mapping application, such that the user equipment may provide navigational assistance to a user among other services provided through access to the map developer 116.

The map database 118 may include node data, road segment data or link data, point of interest (POI) data, or the like. The map database 118 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 118 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 118 can include data about the POIs and their respective locations in the POI records. The map database 118 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 118 can include data relating to signs found along road segments and what those signs mean to the road segments, such as speed limit signs applicable to an associated road segment. Optionally, the map database 118 may include data regarding physical attributes of points of interest, such as building facades, signs indicating a business identity or service provided (or prices thereof), geometric or geographic features, etc.

The map database 118 may be maintained by a content provider e.g., a map developer. By way of example, the map developer can collect geographic data to generate and enhance the map database 118. According to some embodiments, the map database 118 may delegate map generation and revision to other devices, such as mobile devices or vehicle probes. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 118 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a mobile device, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 118 may be a master geographic database, but in alternate embodiments, a client side map database 118 may represent a compiled navigation database that may be used in or with end user devices (e.g., a mobile device) to provide navigation and/or map-related functions. For example, the map database 118 may be used with the mobile device or in-vehicle navigation device to provide an end user with navigation features. In such a case, the map database 118 can be downloaded or stored on the end user device which can access the map database 118 through a wireless or wired connection, such as via a processing server 112 and/or an associated network, for example. Optionally, a portion of the map database 118, such map data regarding a specific roadway, may be downloaded or stored temporarily on an end user device, and according to various embodiments described herein, the mobile device or in-vehicle navigation device may be configured to modify the map data regarding a roadway before sending the map data back to the map database 118.

Using apparatus 100, embodiments of the present invention may establish an iteratively refined dense correspondence from a template to an image which strives to match all pixels and discover more correspondences than a sparse approach. Using these correspondences, candidate homographies may be proposed and tested using a heuristic for rejecting bad homographies and a blocked normalized cross correlation for measuring alignment quality between the template and the image. Using this method, an original sign in a street view image can be replaced with a new sign based on a different template. By bringing the new template into alignment with the original sign in the original image, regions in the original image containing the original sign can be automatically identified, removed, and in-painted (e.g., using Poisson blending with gradient in the in-painted region set to zero). By applying the different template to the same projective transformation that aligns the template to the original sign, imagery for the new sign can be synthesized. To improve the appearance and realism of the new sign within the image, a sequence of image operations including a linear color map, additive Gaussian noise, and Gaussian blurring may be applied whose parameters may be obtained by analyzing the relation between a clean, aligned rendering of the original sign and its appearance in the image of the environment. The new imagery with improved realism may then be seamlessly inserted into the original image using Poisson blending.

According to example embodiments described herein, the input to our method may include a sign image and a template, both assumed to be in grayscale. The sign image may be relatively tightly cropped (e.g., using the bounding box produced by a sign detector) and roughly upright in the view. The template is itself an image and is generally of a different scale than the sign image. As sign images, even of the same type of sign, will vary in size based on distance from the image capturing device, the template is generally of a larger size that can be scaled according to the sign image. The template is resized, which may be an iterative process as described further below, to correspond to the scale of the sign image in order to establish correspondences. This ensures corresponding pixels appear similar when viewed through equally sized patches of pixels. To mitigate blurriness in the resized template, the template may be of a considerably higher resolution than the sign image or may be in vector graphic format (e.g., CAD (computer aided design) drawing, SVG (scalable vector graphics) format, etc.). The sign image may be denoted by I and its size by m×n. The template may be denoted by T and the resized template may be denoted by T' and its size by m'×n'.

A homography establishes a bidirectional mapping between image and template. To clarify the directionality of a homography, we will use H to refer to a homography from image to template, whereas $H^{-1}$ refers to the inverse homography from template to image.

A goal of example embodiments described herein may include finding a homography that maximizes the alignment between I and T', which may be measured, for a given candidate homography H, by the similarity S between $I_H^{m'\times n'}$ and T'.

$$H^* = \underset{H}{\mathrm{argmax}}\, S(I_H^{m'\times n'}, T') \qquad (3)$$

Through this method, alignment is maximized by an iterative propose-and-test strategy. First, correspondences are established per-pixel, finding for each pixel in T', the most similar pixel in I. Candidate homographies are then proposed based on random subsets of the found correspondences. Candidate homographies are each tested by using heuristics for rejecting bad homographies and by using a blocked normal cross correlation for measuring alignment (i.e., S, in Equation 3).

The image of the sign I may be distorted based on the perspective of the environment in the captured image of a street view, and/or due to a sign or sign post being distorted, bent, or otherwise misaligned with the image capturing device. This distortion of I may be distortion relative to the template image T'. Corresponding points may not appear sufficiently similar to be correctly matched due to the relative distortion. Through methods described herein, as I is brought into closer alignment with T', correspondences may be more accurately identified, in turn improving the chances of finding a better homography (i.e., one with greater correspondence). As such, after every L candidate proposals, correspondences may be recomputed by pre-warping I with the best homography found up to that point in the process. Correspondences may be recomputed K times for a total of K×L candidate proposals. FIG. 2 illustrates an example embodiment of a flowchart depicting this recursive looping method.

As shown in FIG. 2, the template image T is resized and rasterized to form T' at 210. Correspondences between T' and I are computed at 220. Candidate homographies are proposed at 230 (described further below), and the candidate homography is tested at 240. A predefined number L candidate homographies are proposed in the loop 250, with the best candidate homography selected after L candidate homographies are tested. The best candidate homography is applied to the template and it is used in a second iteration (of a total of K iterations) in loop 260. T' with the best candidate homography applied is then used to compute correspondences at 220, before candidate homographies are again proposed at 230 and tested at 240 in a loop 250 consisting of L propose-and-test iterations.

According to example embodiments described herein, correspondences may be computed by finding for each pixel in T' its most similar pixel in I, where similarity between a pair of pixels is measured by the normalized cross correlation (NCC) between the k×k patches centered at these pixels. The choice of k can significantly affect the quality of the resulting correspondences. Large patches (i.e., large k value) tend to be more distinctive, where small patches (i.e., low k value) tend to be less distinctive but more robust to deformations. A value of k may be set to roughly one-third of the resized template size and no smaller than 8 pixels.

$$k = \max\left(\left\lceil \frac{\min(m', n')}{3} \right\rceil, 8\right) \quad (4)$$

Patches that straddle the image edge may be padded with invalid pixels, and the normalized cross correlation may be modified to accommodate invalid pixels by restricting normalization to valid pixels only and setting invalid pixels to zero before performing the dot product.

The correspondence quality may be improved by first skipping template pixels centered at low contrast patches, which may be defined as patches whose standard deviation for the shade of the patch is less than a value of 50/255, where 255/255 is a black pixel, and 0/255 is a white pixel. For each non-skipped template pixel, its similarity against all sign image pixels may be computed to obtain a m×n grid of NCC values, which may be referred to as a similarity map. Peaks in the similarity map may be identified as pixels with value no less than four of its neighbors (top, left, bottom, right). A correspondence may be established from the current template pixel to the highest peak (i.e., the most similar sign image pixel), unless there is a second highest peak and its value is greater than 90% of the highest peak. Once all template pixels have been considered and a set of correspondences established, the value of $\bar{s}$ or the median positive similarity of the set may be calculated. A second pass through the pixel patches, pruning correspondences with similarities no greater than $\min(0.6, \bar{s})$. The choice to find correspondences from T' to I rather than from I to T' may be due to I potentially containing patches with no true correspondences in T' (e.g., background pixels). Any correspondences originating from such a patch will be incorrect and thus bad for subsequent steps.

Embodiments described herein may propose candidate homographies, as shown in block 230 of FIG. 2, in an effort to establish the best homography to apply to the template T' to achieve the greatest number of correspondences with I. Each candidate proposal may be computed by using the standard DLT (direct linear transform) algorithm to fit a homography to a random subset of the found correspondences. Large random subsets may provide more robustness to outliers, while small random subsets may have a better chance of not having outliers at all. Embodiments may alternate between candidates computed from small and large random subsets. Denoting N the total number of correspondences, and randi(a, b) a uniformly distributed random integer in [a,b], the following small and large random subset sizes may be used, noting that a homography needs at least four correspondences to be fully constrained.

$$N_{small} = \text{randi}(4, \min(N, 16))$$

$$N_{large} = \text{randi}(4, N) \quad (5)$$

The entire algorithm may be aborted if N<4, a situation which may rarely occur.

Each time the correspondences are recomputed (see loop 260 of FIG. 2) using a version of I that has been warped into closer alignment with T', subsequent homographies estimated based on such correspondences may be post multiplied by the homography used to warp I before being used as a candidate. Said differently, if correspondences are computed from T' to $I_{H'}^{m' \times n'}$ and H is a homography estimated based on such a set of correspondences, then the candidate homography is given by H H'.

Candidate homographies may be tested as shown at 240 of FIG. 2 to determine if the candidate homography is acceptable. One such test involves establishing the horizon of a plane corresponding to an estimated plane of a sign in an image. A tightly cropped image of a sign rarely contains the horizon of the sign's underlying plane. Thus, a candidate homography that has the implied horizon too close to the extent of the cropped image may be rejected. A horizon may be considered too close if it is within 10% of the larger image width or height. FIG. 3 illustrates such an example embodiment in which the horizon line 310 of the underlying plane 320 of the sign image is visible within the m×n image.

As shown in FIG. 3, the quadrilateral 320 is the result of warping an arbitrary rectangle onto a m×n image. The homography used to warp the rectangle implies a horizon 310 that is too near the image extent, and is thus rejected.

The extended boundary 330 shifted by 10% shown as 340 represents the bounds within which a computed horizon is too close to the extent of the cropped image. Given a candidate homography H, the implied horizon 310 can be computed by finding the line that passes through the two image space vanishing points the $v_x$ and $v_y$ corresponding to template-space horizontal and vertical lines. Specifically, if the i-th row, j-th column entry of $H^{-1}$ is given by $h_{ij}$, then:

$$v_x = \left(\frac{h_{11}}{h_{31}}, \frac{h_{21}}{h_{31}}\right) \quad (6)$$

$$v_y = \left(\frac{h_{12}}{h_{32}}, \frac{h_{22}}{h_{32}}\right)$$

Due to varying conditions in lighting and exposure, images in perfect alignment may still have very different pixel values. The normalized cross correlation attempts to remove such differences by subtracting the mean from an image and dividing it by its standard deviation prior to computing its dot product with another image. However, the normalized cross correlation's use of a single mean and standard deviation throughout an image sometimes leaves certain high contrast edges inadequately attenuated and certain low contrast edges insufficiently amplified, as shown in FIG. 4. Therefore, a blocked normalized cross correlation may be used to mitigate these issues. The image may be divided into c pixels×c pixels cells, padding the original image with invalid pixels such that its width and height are multiples of c pixels. For each b×b block of cells, the normalized cross correlation (NCC) may be computed with the b×b block at the same position in the other image. The blocked normalization cross correlation (NBCC) may then be given by the NCC averaged over all blocks. The BNCC value is necessarily in [−1,1]. The handing of invalid pixels may be the same as described above.

Example embodiments described herein may scale and rasterize template image T into T', such that T' has size comparable to I, as shown in block 210 o FIG. 2. A set of eleven trial scaling factors may be used between $s/\sqrt{2}$ and s $\sqrt{2}$, given by $$s_i = s2^{\frac{i}{10}},$$

where i=−5, . . . ,5 and s is the scaling factor that allows T to fit tightly inside I. For each $s_i$, the template T may be resized by $s_i$ to obtain $T'_i$. Dense correspondences may be computed between the resized template $T'_i$ and I, and the number of correspondences $n_i$ may be recorded. As described above, candidate homographies may be proposed using the same method as 230 of FIG. 2, and the median projection error in the resized template may be computed. The smallest median reprojection error $\varepsilon_i$ achieved over all proposed homographies at the i-th scale is recorded. Ideally, a scaling factor $s_i$ is desired with a high $n_i$ (number of correspondences) and a low $\varepsilon_i$ (reprojection error). The following heuristic may be used to chose i:

$$i^* = \operatorname*{argmax}_i \{n_i \mid \varepsilon_i \le \operatorname{median}\{\varepsilon_i \mid n_i > 16\}\} \quad (7)$$

If all $n_i \le 16$, then the algorithm may be aborted. However, this is rarely the case. Finally, T' is obtained using the chosen scaling factor $s_{i^*}$ to scale T.

Finding correspondences, as described above, compares all pairs of patches between I and T'. This becomes very time consuming for large I's, since large images require the use of large patches (Equation 4). An exhaustive correspondence search on the original, potentially large image, can be avoided by performing the procedure described above on a scaled-down version of the original image, such as a maximum of 48 pixels along the width or height, and recursively using a homography found at a lower resolution to facilitate correspondence search at higher resolutions. During each recursive iteration, the image and template may be upscaled by a factor no greater than two. The upscaled image may be pre-warped using the previous scale's homography estimate conjugated (i.e., matrix A conjugated by matrix X means $XAX^{-1}$) by the appropriate upscaling matrix. For each pixel in the template, a 5×5 pixel window centered at the same position in the warped image may be searched. FIG. 5 illustrates such an example embodiment of coarse to fine refinement for estimating the homography mapping a sign image I to a template T'. According to the illustrated embodiment of FIG. 5 for a given refinement iteration I, the image is scaled by $s_i$:

$$s_1 = 48 \text{ pixels}/\max(m,n)$$

$$s_i = \min(1, 2s_{i-1}), i \ge 2$$

and the template T' is scaled by $\bar{s}_i$:

$$\bar{s}_i = s_i \times \frac{s_{T'}}{s_1}$$

where $s_{T'}$ is the scaling factor for scaling T into T', as computed by 210 of FIG. 2. The "align" block of FIG. 5 encapsulates the steps of computing template to image correspondences, proposing candidate homographies, and testing the candidate homographies, as detailed above with respect to blocks 220, 230, and 240 of FIG. 2. The asterisk indicates that a homography from the previous refinement iteration is used to pre-warp the sign image prior to finding correspondences.

Example embodiments described herein may be applied to both real and synthetic sign images for template alignment, examples of which are described herein with respect to evaluation of the aforementioned methods for aligning template images with captured images. In order to recognize sign images in an image captured through an image capture device, a database of template images may be maintained and evaluated for comparison purposes. Real images of signs may be obtained, such as signs related to specific entities, such as companies, having ubiquitous logos on their respective signs. Images containing one or more logos of interest may be compiled. Each logo instance may be cropped from the full image to obtain a database of logo images. To test performance on low resolution images, logo images may be resized to at most 48 pixels along a width and/or a height. Since the true homographies associated with real logo images are not known, subjective evaluation of the results may be used. Alignments obtained through the methods described above may be manually corrected as needed using a graphic user interface for warping a template by allowing the user to drag the template's corner positions. The result for each test image may be categorized by the severity of the alignment error (i.e., the amount of correction required) into one of three categories: grossly incorrect, slightly incorrect, or appears correct (i.e., no correction applied). Grossly incorrect results are evident when the template is warped in a physically impossible manner. The distinction between slightly incorrect and appears correct is more ambiguous, particularly on low resolution images, where a continuum of slightly perturbed template alignments may each appear equally correct.

Using homographies computed from the real logo images and manually corrected, the template images may be warped to obtain synthetic logo images with known homographies. Given an m×n template, a computed homography H and a ground truth homography $H_{GT}$, the image domain alignment error may be quantified according to the following:

$$\epsilon_I(H, H_{GT}) = \frac{1}{mn} \Sigma_{x=1}^{n} \Sigma_{y=1}^{m} \| H^{-1}(x, y) - H_{GT}^{-1}(x, y) \|_2 \quad (8)$$

The template domain alignment error may be quantified according to the following:

$$\epsilon_{T'}(H, H_{GT}) = \frac{100}{\max(m, n)} \cdot \frac{1}{mn} \sum_{x=1}^{n} \sum_{y=1}^{m} \| H(H_{GT}^{-1}(x, y)) \|_2 \quad (9)$$

The image domain alignment error measures the accuracy of mapping points onto a given input image, which is of interest in applications seeking to warp and composite new two-dimensional patterns onto a given image, such as in augmented reality or image synthesis applications. The template domain alignment error measures the accuracy of undoing the ground truth homography underlying a given input image, which may be useful in applications seeking to "rectify" sign images onto a common template reference frame for further analysis. The $$\frac{100}{\max(m, n)}$$

term of equation (9) normalizes template domain errors to be comparable across varying template sizes, in effect scaling the template to have size of at most 100 pixels along either width or height.

Methods described herein may, for example, achieve mean alignment errors of 0.2740 pixels and 0.8768 pixels for image and template domain cases, respectively according to a series of test cases. FIG. 6 illustrates the effect of image size, taken here to be min(m',n'), on alignment error found mostly to be less than one pixel in the image domain for images as small as 15×11. Alignment errors may be measured by applying methods described herein to synthetic logo images with known ground truth alignments, and applying equations (8) and (9) above. Image size is defined herein to be the smaller of image height and width.

Real sign images exhibit a much greater appearance variation due to differences in blur, coloring, occlusion, background, etc. That makes it more difficult than in synthetic inputs to establish accurate correspondences and to recognize good alignments. Results presented here for synthetic inputs can thus be interpreted as a best case scenario performance of the methods described herein.

Having recovered the homography H relating a sign image I to a template $T_1$ using methods described above, the original sign in I may be replaced with a new sign based on a different template: $T_2$. By bringing $T_1$ into alignment with the original sign I, regions in I containing the original sign can be automatically identified, removed, and inpainted (e.g., using Poisson blending with gradient in the inpainted region set to 0). By applying to $T_2$ the same projective transformation that aligns $T_1$ to the original sign, imagery for the new sign can be synthesized. Direct overlaying of the new imagery onto I would look conspicuously fake, due to differences in color shades, image sharpness, and noisiness at the interface between real and synthesized imagery. Realism may be improved by applying a sequence of image operations including a linear color map, additive Gaussian noise, Gaussian blurring, whose parameters are obtained by analyzing the relation between a clean, aligned rendering of the original sign and its actual appearance in I. The new imagery, with improved realism, may then be seamlessly inserted into the original image using Poisson blending.

While the aforementioned embodiments describe generally the homography estimation and replacement of signs, embodiments described herein could optionally be applied to various other features of an image. For example, building facades can be replaced using the same methods described herein, such as when a location changes from one business to another business, and the building façade can be replaced by an image of that businesses' conventional signage or build-out. This can be performed without having to capture all-new street-view images. Other elements of an image can be replaced using the same or similar methods as described herein, including geographic features, temporary banners (e.g., grand opening, now leasing, special events, etc.), or the like. According to some embodiments, signs can be placed into street-view images using methods described herein but supplementing existing signs. For example, the homography of a sign can be used to establish a position and orientation of a new sign added to an image, which may include traffic-related information that has been added to a map (e.g., in map database 118), or for the addition of product advertising to an image (e.g., a virtual billboard). In each case, a sign, a geographic feature, a building façade or the like may be considered an object, where an image of the object is included in an image of an envrionement.

FIG. 7 illustrates an example embodiment of sign replacement. In step 1, $H^{-1}$ is used to warp $T_1$ to obtain $R_1$ a clean, aligned rendering of the original sign. Given a predefined sequence of image operations $f_\theta$, parameters θ are estimated such that $f_\theta(R_1)$ is as similar as possible to I. Let $\hat{\theta}$ denote the estimated parameters. In step 2, $H^{-1}$ is used to warp $T_2$ to obtain $R_2$ and $f_{\hat{\theta}}$ is applied to $R_2$ to obtain new realistic imagery of $T_2$. In step 3, the original sign is replaced by new the imagery of $T_2$.

Embodiments described herein may detect signs and identify the type of sign or the information conveyed by the sign. For example, embodiments may detect speed limit signs along a roadway and identify from the detected sign a numerical speed limit. In order to detect particular types of signs and to interpret them, embodiments may reference a database of sign types with each sign type having multiple learning/training images of the sign across a range of viewing conditions (e.g., viewed slightly from the left/right/top/bottom, under bright/dark lighting, etc.). The signs may be learned as they are collected via image recognition and added to a training database to enhance the database with images of signs from different perspectives and under different viewing conditions. However, some signs are rarely encountered or captured in an image. One such sign may be a do not enter sign which may rarely be captured since images of the roadway environment are often captured along a path traversed by a vehicle, and vehicles generally do not traverse a path marked by a do not enter sign. Similarly, a "no car" sign that may be present where cars are not intended to go may be rarely captured or seen. In such embodiments, methods described herein can replace images of a frequently occurring sign with a realistically appearing replacement including an infrequently occurring sign and provide these to the training database. In this manner many realistic images of a rarely occurring sign can be captured and stored to the training database. This enables sign detectors to be trained using synthetic images of signs that can be equally as accurate as sign detectors trained using real images of signs.

FIG. 8 illustrates an example embodiment of an implementation of methods described herein on a user interface 800. As depicted in the user interface 800, a street-view image of a road is provided, such as on a display of a user interface, and the street-view image includes an image of a sign indicating a speed limit of 45 miles per hour. The image of user interface 800 may be an image as captured by, for example, image capture device 108 of FIG. 2, including a sign that is physically located in the environment captured by the image. The user interface 810 illustrates an example embodiment in which the sign of the image in 800 is replaced by a new sign indicating that the speed limit for trucks is 40 miles per hour. Such a replacement may be performed, for example, when a user device providing the user interface display may be aware of a context, such as a type of vehicle driven by a user. This may occur, for example, in a vehicle with an in-vehicle navigation system. If the vehicle is classified as a truck (e.g., by a department of transportation or the like), the context may be that of a truck. In the context of a truck, certain signs may be important, such as signs indicating a low bridge, a narrow road, or a differing speed limit for trucks as shown in FIG. 8. Therefore, embodiments described herein may replace the non-truck speed limit sign of the street view image of user interface 800 with a truck speed limit sign as shown in user interface 810. As described above, graphical properties of the replacement sign beyond the size and orientation of the sign may be applied to the replacement sign, such as the lighting of the original sign, the color of the original sign, etc. This may help blend the replacement sign into the user interface seamlessly to appear naturally occurring in the environment.

FIGS. 2 and 9 are flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 104 of an apparatus 100 employing an embodiment of the present invention and executed by a processor 102 of the apparatus 100. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 9 illustrates a method for scaling a template according to an image and iteratively testing candidate homographies in order to establish the homography that provides the best correspondence between the template and the image. The illustrated method includes receiving an image including an image of a sign at 710. At 720, a first template is received. The first template is resized at 730 to obtain a scaled first template having a size comparable to the size of the image. A number of correspondences between the scaled first template and the image are calculated at 740. A candidate homography is received at 750 and tested at 760. In response to the candidate homography being established as corresponding to the image of the sign, the image of the sign is replaced with a second template of a different sign according to the candidate homography as shown at 770.

In an example embodiment, an apparatus for performing the method of FIG. 7 may comprise a processor (e.g., the processor 102) configured to perform some or each of the operations (710-770) described above. The processor may, for example, be configured to perform the operations (710-770) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-770 may comprise, for example, the processor 102 and/or a device or circuit for executing instructions or executing an algorithm for processing information as described above.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments set forth herein will come to mind to one skilled in the art to which these embodiments pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
receive an image of an environment comprising an image of an object within the image of the environment;
receive a first template;
resize the first template to obtain a scaled first template having a size corresponding to a size of the image of the object;
calculate a number of correspondences between the scaled first template and the image of the object;
receive a candidate homography;
test the candidate homography;
establish the candidate homography as corresponding to the image of the object; and
replace the image of the object with a second template of a different object according to the candidate homography in response to the candidate homography being established as corresponding to the image of the object.

2. The apparatus of claim 1, wherein causing the apparatus to replace the image of the object with a second template of a different object comprises causing the apparatus to:
receive the second template; and
apply a projective transformation to the second template corresponding to a projective transformation determined to align the scaled first template to the image of the object.

3. The apparatus of claim 2, wherein causing the apparatus to replace the image of the object with a second template of a different object further comprises causing the apparatus to:
establish a relationship between a clean, aligned rendering of an object corresponding to the object of the image of the object;
obtain parameters of the relationship for one or more of a linear color map, additive Gaussian noise, or Gaussian blurring; and
apply the one or more of the linear color map, additive Gaussian noise, or Gaussian blurring to the second template according to the obtained parameters.

4. The apparatus of claim 1, wherein causing the apparatus to resize the first template to obtain a scaled first template having a size corresponding to a size of the image of the object comprises causing the apparatus to:
apply a plurality of scaling factors to the first template, wherein the plurality of scaling factors are within a predefined range, wherein each scaling factor applied to the first template results in a respective trial scaled first template;
for each trial scaled first template, compute a number of dense correspondences between the trial scaled first template and the image of the object;
for each trial scaled first template, compute a median projection error between the trial scaled first template and the image of the object; and
apply an algorithm to the number of dense correspondences and the median projection error for each trial scaled first template to establish the trial scaled first template to be selected as the scaled first template.

5. The apparatus of claim 1, wherein causing the apparatus to test the candidate homography comprises causing the apparatus to:
determine an average value and standard deviation for pixel value of the image of the object;
determine an average value and standard deviation for pixel value of the scaled template;
subtract the average value for pixel value of the image of the object from the value of each pixel of the image of the object to obtain a corrected pixel value for each pixel and divide the corrected value of each pixel of by the standard deviation for the pixel value of the image of the object to obtain a normalized value of each pixel of the image of the object;
subtract the average value for pixel value of the scaled first template from the value of each pixel of the scaled first template to obtain a corrected pixel value for each pixel and divide the corrected value of each pixel of by the standard deviation for the pixel value of the image of the object to obtain a normalized value of each pixel of the scaled first template; and
determine the similarity between the image of the object and the scaled first template using the normalized values for each pixel.

6. The apparatus of claim 1, wherein causing the apparatus to test the candidate homography comprises causing the apparatus to:
calculate an implied horizon of an underlying plane corresponding to the object in the image of the object;
determine if the implied horizon is within a predefined measure of the image of the object; and
reject the candidate homography in response to the implied horizon being within a predefined measure of the image of the object.

7. The apparatus of claim 1, wherein causing the apparatus to calculate a number of correspondences between the scaled first template and the image of the object comprises causing the apparatus to:
determine pixels of the scaled template to skip; and
for each non-skipped pixel in the scaled template, find its most similar pixel in the image of the object, where similarity is measured by causing the apparatus to measure a normalized cross correlation between a patch of pixels of a predetermined width and height centered at each non-skipped pixel in the scaled template.

8. The apparatus of claim 7, wherein causing the apparatus to determine pixels of the scaled template to skip comprises causing the apparatus to skip pixels centered within patches of a predetermined width and height having a standard deviation among the pixels of a respective patch below a predefined value.

9. The apparatus of claim 1, wherein in response to causing the apparatus to test the candidate homography, causing the apparatus to:
propose a new candidate homography; and
test the new candidate homography.

10. The apparatus of claim 9, wherein in response to causing the apparatus to test the new candidate homography, and in response to a number of proposed candidate homographies not reaching a predefined number of iterations of candidate homographies, causing the apparatus to:
propose another new candidate homography; and
test the another new candidate homography.

11. The apparatus of claim 10, wherein in response to the number of proposed candidate homographies reaching the predefined number of iterations of candidate homographies, causing the apparatus to:
establish a preferred homography from among the proposed candidate homographies;
in response to the number of iterations of calculating correspondences not reaching another predetermined number of iterations, calculate a number of correspondences between the scaled first template with the preferred homography applied and the image of the object;
receive another candidate homography; and
test the another candidate homography as applied to the scaled first template with the preferred homography applied.

12. A computer program product comprising at least one non-transitory computer-readable storage medium having computer-executable program code portions stored therein, the computer-executable program code portions comprising program code instructions that, when executed by a processor, cause an apparatus to:
receive an image of an environment comprising an image of an object within the image of the environment;
receive a first template;
resize the first template to obtain a scaled first template having a size corresponding to a size of the image of the object;
calculate a number of correspondences between the scaled first template and the image of the object;
receive a candidate homography;
test the candidate homography;
establish the candidate homography as corresponding to the image of the object; and
replace the image of the object with a second template of a different object according to the candidate homography in response to the candidate homography being established as corresponding to the image of the object.

13. The computer program product of claim 12, wherein the program code instructions to cause the apparatus to replace the image of the object with a second template of a different object comprises program code instructions to cause the apparatus to:
receive the second template; and
apply a projective transformation to the second template corresponding to a projective transformation determined to align the scaled first template to the image of the object.

14. The computer program product of claim 13, wherein the program code instructions to cause the apparatus to replace the image of the object with a second template of a different object further comprises program code instructions to cause the apparatus to:
establish a relationship between a clean, aligned rendering of an object corresponding to the object of the image of the object;
obtain parameters from the relationship for one or more of a linear color map, additive Gaussian noise, or Gaussian blurring; and
apply the one or more of the linear color map, additive Gaussian noise, or Gaussian blurring to the second template according to the obtained parameters.

15. The computer program product of claim 12, wherein the program code instructions to cause the apparatus to resize the first template to obtain a scaled first template having a size corresponding to a size of the image of the object comprises program code instructions to cause the apparatus to:
apply a plurality of scaling factors to the first template, wherein the plurality of scaling factors are within a predefined range, wherein each scaling factor applied to the first template results in a respective trial scaled first template;
for each trial scaled first template, compute a number of dense correspondences between the trial scaled first template and the image of the object;
for each trial scaled first template, compute a median projection error between the trial scaled first template and the image of the object; and
apply an algorithm to the number of dense correspondences and the median projection error for each trial scaled first template to establish the trial scaled first template to be selected as the scaled first template.

16. The computer program product of claim 12, wherein the program code instructions to cause the apparatus to test a candidate homography comprises program code instructions to cause the apparatus to:
determine an average value and standard deviation for pixel value of the image of the object;
determine an average value and standard deviation for pixel value of the scaled template;
subtract the average value for pixel value of the image of the object from the value of each pixel of the image of the object to obtain a corrected pixel value for each pixel and divide the corrected value of each pixel by the standard deviation for the pixel value of the image to obtain a normalized value of each pixel of the image of the object;
subtract the average value for pixel value of the scaled first template from the value of each pixel of the scaled first template to obtain a corrected pixel value for each pixel and divide the corrected value of each pixel of by the standard deviation for the pixel value of the image of the object to obtain a normalized value of each pixel of the scaled first template; and
determine the similarity between the image of the object and the scaled first template using the normalized values for each pixel.

17. The computer program product of claim 12, wherein the program code instructions to cause the apparatus to test the candidate homography comprises program code instructions to cause the apparatus to:
calculate an implied horizon of an underlying plane corresponding to the object in the image of the object;
determine if the implied horizon is within a predefined measure of the image of the object; and
reject the candidate homography in response to the implied horizon being within a predefined measure of the image of the object.

18. The computer program product of claim 12, wherein the program code instructions to cause the apparatus to calculate a number of correspondences between the scaled first template and the image of the object comprises program code instructions to cause the apparatus to:
determine pixels of the scaled template to skip; and for each non-skipped pixel in the scaled template, find its most similar pixel in the image of the object, where similarity is measured by causing the apparatus to measure a normalized cross correlation between a patch of pixels of a predetermined width and height centered at each non-skipped pixel in the scaled template.

19. The computer program product of claim 18, wherein the program code instructions to cause the apparatus to determine pixels of the scaled template to skip comprises program code instructions to cause the apparatus to skip pixels centered within patches of a predetermined width and height having a standard deviation among the pixels of a respective patch below a predefined value.

20. A user interface, comprising:
a display providing for presentation of an image of an environment, wherein an object in the environment captured by the image is replaced by an image of an object by a processor, wherein said processor is configured to:
receive the image of the environment comprising the image of the object within the image of the environment;
resize a first template to obtain a scaled first template having a size corresponding to a size of the image of the object;
calculate a number of correspondences between the scaled first template and the image of the object;
receive a candidate homography;
test the candidate homography;
establish the candidate homography as corresponding to the image of the object; and
replace the image of the object with a second template of a different object according to the candidate homography in response to the candidate homography being established as corresponding to the image of the object.

21. The user interface of claim 20, wherein the processor configured to replace the image of the object with a second template of a different object comprises the processor being configured to:
receive the second template; and
apply a projective transformation to the second template corresponding to a projective transformation determined to align the scaled first template to the image of the object.

22. The user interface of claim 21, wherein the processor configured to replace the image of the object with a second template of a different object comprises the processor being configured to:
establish a relationship between a clean, aligned rendering of an object corresponding to the object of the image of the object;
obtain parameters from the relationship for one or more of a linear color map, additive Gaussian noise, or Gaussian blurring; and
apply the one or more of the linear color map, additive Gaussian noise, or Gaussian blurring to the second template according to the obtained parameters.

23. The user interface of claim 20, wherein the processor configured to resize the first template to obtain a scaled first template having a size corresponding to a size of the image of the object comprises the processor being configured to:
apply a plurality of scaling factors to the first template, wherein the plurality of scaling factors are within a predefined range, wherein each scaling factor applied to the first template results in a respective trial scaled first template;
for each trial scaled first template, compute a number of dense correspondences between the trial scaled first template and the image of the object;
for each trial scaled first template, compute a median projection error between the trial scaled first template and the image of the object; and
apply an algorithm to the number of dense correspondences and the median projection error for each trial scaled first template to establish the trial scaled first template to be selected as the scaled first template.

* * * * *